United States Patent
Kilbert (10) Patent No.: US 12,257,520 B2
(45) Date of Patent: Mar. 25, 2025

(54) SYSTEMS AND METHODS FOR TRANSFERRING A PASSENGER COMPARTMENT BETWEEN RIDE SYSTEMS USING ROBOTIC TOOL CHANGERS

(71) Applicant: Disney Enterprises, Inc., Burbank, CA (US)

(72) Inventor: Michael Kilbert, Santa Clarita, CA (US)

(73) Assignee: Disney Enterprises, Inc., Burbank, CA (US)

( * ) Notice: Subject to any disclaimer, the term of this patent is extended or adjusted under 35 U.S.C. 154(b) by 305 days.

(21) Appl. No.: 17/656,421

(22) Filed: Mar. 24, 2022

(65) Prior Publication Data

US 2023/0302373 A1  Sep. 28, 2023

(51) Int. Cl.
*A63G 31/02* (2006.01)
*A63G 21/20* (2006.01)

(52) U.S. Cl.
CPC ............. *A63G 31/02* (2013.01); *A63G 21/20* (2013.01)

(58) Field of Classification Search
CPC ........ A53G 31/00; A53G 31/02; A53G 31/16; A53G 21/20; A53G 1/48; A53G 7/00; A53G 25/00; B60L 9/00
USPC ............................................... 472/43, 59–61
See application file for complete search history.

(56) References Cited

U.S. PATENT DOCUMENTS

| | | | |
|---|---|---|---|
| 6,871,596 B2 | 3/2005 | De-Gol | |
| 9,468,857 B2* | 10/2016 | De-Gol | B25J 11/003 |
| 2002/0183123 A1* | 12/2002 | De-Gol | B25J 11/00 472/59 |
| 2018/0290062 A1* | 10/2018 | Hu | A63G 31/16 |
| 2019/0111350 A1 | 4/2019 | Fornoff et al. | |

FOREIGN PATENT DOCUMENTS

| | | |
|---|---|---|
| DE | 102018209174 A1 | 12/2019 |
| EP | 0997176 A2 | 5/2000 |
| JP | 5411270 B2 | 12/2014 |
| JP | 6871754 B2 | 12/2021 |

OTHER PUBLICATIONS

European Search Report, European Patent Application No. 23159746, Dated Aug. 30, 2023.

* cited by examiner

*Primary Examiner* — Kien T Nguyen
(74) *Attorney, Agent, or Firm* — Foley & Lardner LLP (57) ABSTRACT

In some implementations, a controller may cause a robotic arm connector, of the robotic arm, to be connected to a first compartment connector of a passenger compartment of an amusement ride. The controller may cause a second compartment connector, of the passenger compartment, to be disconnected from a first structure connector of a first support structure. The controller may transport the passenger compartment from the first support structure to a second support structure after causing the second compartment connector to be disconnected from the first structure connector.

20 Claims, 5 Drawing Sheets

SYSTEMS AND METHODS FOR TRANSFERRING A PASSENGER COMPARTMENT BETWEEN RIDE SYSTEMS USING ROBOTIC TOOL CHANGERS

BACKGROUND

A typical ride system is composed of a passenger vehicle which transports passengers through a ride experience. The passenger vehicle typically has a system or device that propels the passenger vehicle through the ride experience and a passenger compartment configured to receive one or more passengers (e.g., one or more riders). For example, the passenger compartment may transport the one or more passengers from one portion of a ride system to another portion of a ride system. In some instances, a passenger may control a movement of the passenger compartment.

DETAILED DESCRIPTION OF PREFERRED EMBODIMENTS

The following detailed description of example implementations refers to the accompanying drawings. The same reference numbers in different drawings may identify the same or similar elements.

Typically, a venue will have only one ride system which provides a single ride experience. The ride experience may be improved if multiple ride systems are provided at a single venue. If multiple ride systems are provided, each ride system may be associated with one or more passenger compartments. A first ride system may provide a ride experience that is separate and distinct from a ride experience provided by a second ride system. Additionally, the one or more passenger compartments (of the first ride system) are separate from and operate independently with respect to the one or more passenger compartments of the second ride system. Any attempt to transfer the one or more passenger compartments from the first ride system to the second ride system (vice versa) requires the transfer to performed safely and in timely manner, in order to maintain a satisfactory passenger experience.

Transferring the one or more passenger compartments in this manner presents a considerable measure of difficulty. For example, such transfer may require a measure of coordination between computing and mechanical devices and/or other devices associated with each ride system. Therefore, such transfer consumes computing resources, networks resources, storage resources, among other resources. The transfer of a passenger compartment from one ride system to another ride system typically takes a considerable amount of time in order to be done safely. Such considerable amount of time disrupts the ride experience. Additionally, there are considerable amount of restrictions on the types of movements that the passenger compartment can experience due to the nature of the physical connection of the passenger compartment.

Moreover, generally operating a ride system requires loading and unloading passengers from one or more passenger compartments of the ride system. Loading and unloading passengers is a time consuming process that is performed using one or more computing devices and the assistance of one or more ride operators. Accordingly, the resources consumed by loading and unloading passengers in this manner includes, but are not limited to, computing resources, networks resources, storage resources, and manual labor.

Implementations described herein resolve one or more of the problems described above. For example, implementations described are directed to utilizing a robotic arm to transfer a passenger compartment between different ride systems. In some examples, the robotic arm may be a robotic arm of an industrial robot and the passenger compartment may include two points of connections (e.g., a first compartment connector and a second compartment connector). The first compartment connector and the second compartment connector may enable the passenger compartment to be quickly and safely connected to and safely disconnected from different ride systems.

In some situations, the first compartment connector may be connected to a robotic arm connector of the robotic arm and the second compartment connector may be connected to a connector of a first ride system. When disconnecting the passenger compartment from the first ride system, the second compartment connector may not be disconnected until the second compartment connector receives an indication that the first compartment connector has been securely connected to the robotic arm connector of the robotic arm. Similarly, when connecting the passenger compartment from the second ride system, the first compartment connector may not be disconnected until the first compartment connector receives an indication that the second compartment connector has been securely connected to a connector of the second ride system. In this regard, a measure of secure connection associated with the passenger compartment may be maintained during the transfer of the passenger compartment between ride systems.

In some examples, the connectors described herein may utilize tool changer technology. For example, the robotic arm connector of the robotic arm and the second compartment connector may include a master connector of a robotic tool changer. The first compartment connector may include a tool connector of the robotic tool changer. The connectors described herein may have the capabilities of transferring electrical power, pneumatic power, and communications (Ethernet) across connection (associated with the connectors), thereby allowing for animation, lighting, and special effects onboard the passenger compartment.

Additionally, implementations described herein may be improve a timing efficiency of operating ride systems. For example, implementation described herein may enable rapid loading of a ride system by preloading passengers into the passenger compartment prior to the passenger compartment being connected to the ride system and then automatically loading the passenger compartment onto the ride system by connecting the passenger compartment to the ride system. Preloading passengers in this manner is especially effective for passengers that need more time to load into the passenger compartment, such as passengers with disabilities. By preloading passengers in this manner, implementations described herein may preserve computing resources, networks resources, storage resources, and labor, among other resources that would have otherwise been consumed by loading and unloading passengers as currently performed when operating a ride system. Additionally, in the case of a ride system with a continually moving chain of passenger vehicles (e.g., an omnimover), implementations described herein are configured to accommodate a very slow loading passenger while enabling the chain to continue moving (e.g., without causing the chain to stop). Accordingly, implementations described herein improve throughput as well as improve the ride experience for all other passengers on such ride system.

Furthermore, implementations described herein may enable a combination of multiple ride systems, thereby providing a unique passenger experience. For example, the passenger compartment may be transferred (e.g., using a robotic arms) between a dark ride vehicle ride system and a suspended coaster. Additionally, or alternatively, the passenger compartment may be transferred (e.g., using a robotic arms) between a boat ride system (e.g., a boat ride vehicle) and a road based ride system (e.g., a road based vehicle). Additionally, or alternatively, a dark ride vehicle ride may be picked up by a robotic arm. Additionally, or alternatively, a passenger compartment may be passed between two robotic arms.

Figure 1:
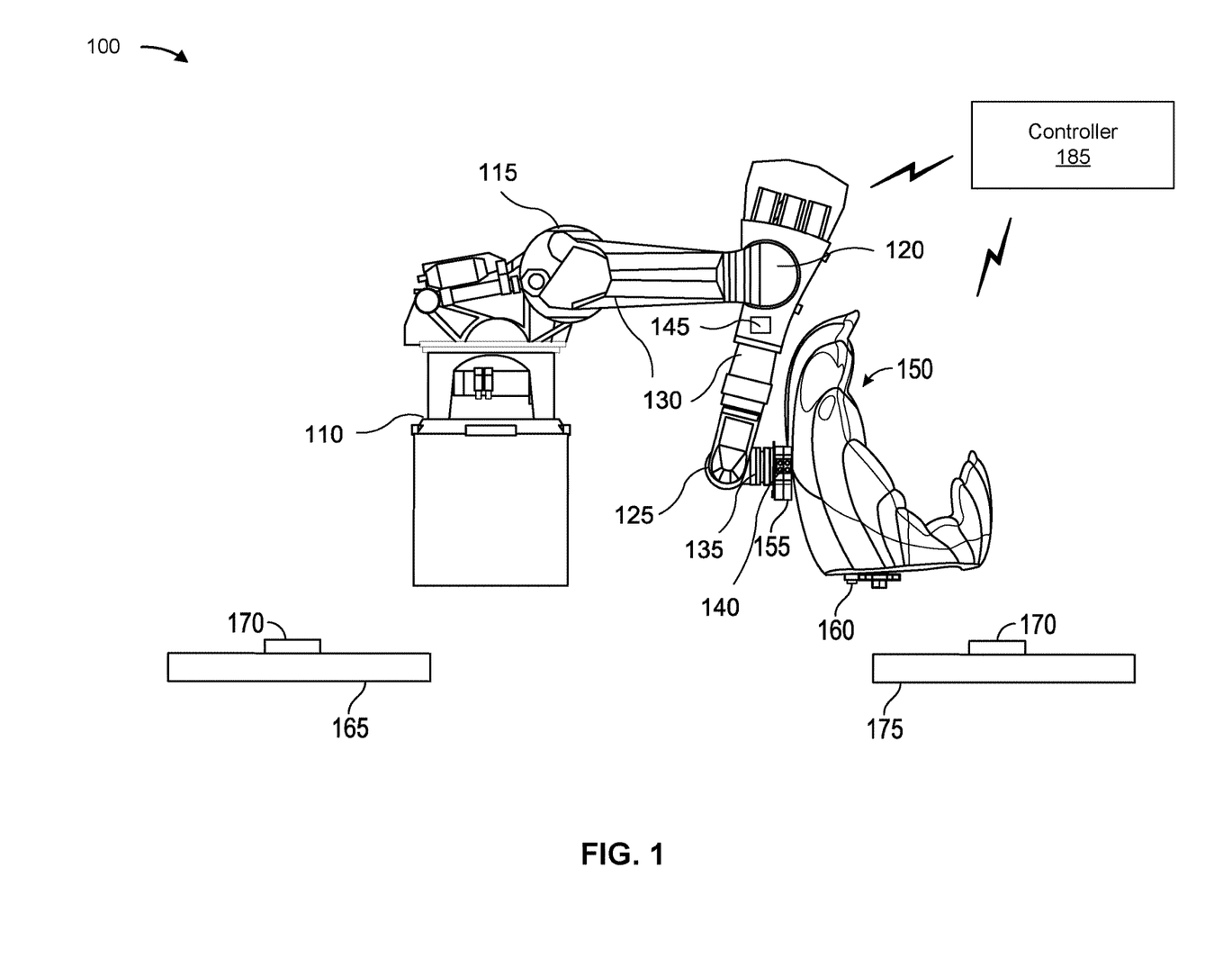
FIG. 1 is a diagram of an example associated with transferring a passenger compartment between ride systems using a robotic arm.

FIG. 1 is a diagram of an example 100 associated with transferring a passenger compartment between ride systems using a robotic arm. As shown in FIG. 1, example 100 includes a robot assembly 105, a passenger compartment 150, a first support structure 165, a second support structure 175, and a controller 185. Robot assembly 105, passenger compartment 150, first support structure 165, second support structure 175, and controller 185 may part of an amusement park ride. Robot assembly 105 may include a base 110, a shoulder 115, an elbow 120, a wrist 125, and a robotic arm 130. An end effector 135 may be provided at a distal end of robotic arm 130. End effector 135 may include or may be connected to robotic arm connector 140. Base 110, shoulder 115, elbow 120, and/or wrist 125 may be configured to be moved in various directions to enable end effector 135 and/or robotic arm connector 140 to be positioned in a manner to establish a connection with a compartment connector of passenger compartment 150.

In some implementations, robot assembly 105 may be an industrial robot. In this regard, robotic arm connector 140 may be a master connector of a robotic tool changer. Robotic arm connector 140 may include one or more devices capable of detecting a secured connection to another connector and generate secured connection data indicating the secured connection. In some examples, robotic arm connector 140 may include a wireless communication component (not shown).

The wireless communication component may include one or more devices that are capable of communicating with controller 185. For example, the wireless communication component may provide the secured connection data to controller 185, may receive secured connection data from another connector, may receive (e.g., from controller 185) an indication to disconnect from another connector, among other examples.

The wireless communication component of robotic arm connector 140 may include a transceiver, a separate transmitter and receiver, an antenna, among other examples. The wireless communication component may communicate with the one or more machines using a short-range wireless communication protocol such as, for example, BLUETOOTH® Low-Energy, BLUETOOTH®, Wi-Fi, near-field communication (NFC), Z-Wave, ZigBee, or Institute of Electrical and Electronics Engineers (IEEE) 802.154, among other examples.

Sensor device 145 may include one or more devices configured to sense an environment surrounding robot assembly 105 and generate sensor data regarding the environment. For example, sensor device 145 may include a vision system, a microphone, a light detection and ranging (LIDAR) system, a radio detection and ranging (RADAR) system. The sensor data may include information identifying one or more objects in the environment. The sensor data may be used by controller 185 to control robot assembly 105 to identify a location of connectors with which robotic arm connector 140 may establish a connection, identify obstacles in a path of robot assembly 105, among other examples. Robot assembly 105 may include one or more sensor devices 145.

Passenger compartment 150 may include one or more passenger seat assemblies and one or more retention devices associated with the one or more passenger seat assemblies. Additionally, or alternatively, passenger compartment 150 may include a first compartment connector 155 and a second compartment connector 160. First compartment connector 155 may be configured to be connected to robotic arm connector 140 and second compartment connector 160 may be configured to be connected to a first support structure 165 or to second support structure 175

In some examples, first compartment connector 155 and second compartment connector 160 may utilize tool changer technology. For example, second compartment connector 160 may include a master connector of a robotic tool changer and first compartment connector 155 may include a tool connector of the robotic tool changer.

First compartment connector 155 and/or second compartment connector 160 may be similar to robotic arm connector 140. For example, first compartment connector 155 and/or second compartment connector 160 may include one or more devices capable of detecting a secured connection to another connector and generate secured connection data indicating the secured connection. In some examples, first compartment connector 155 and/or second compartment connector 160 may include a wireless communication component capable of communicating with controller 185, in a manner similar to the manner described above in connection with robotic arm connector 140. For example, the wireless communication component may provide the secured connection data to controller 185, may receive secured connection data from another connector, may receive (e.g., from controller 185) an indication to disconnect from another connector, among other examples.

In some examples, first compartment connector 155 and second compartment connector 160 may have the capabilities of transferring electrical power, pneumatic power, and communications (Ethernet) across connection (associated with the connectors), thereby allowing for animation and lighting onboard passenger compartment 150.

First support structure 165 may be a support structure that is part of a first ride system. For example, first support structure 165 may include a platform, a track, a conveying device, among other examples. First support structure 165 may be a stationary structure or a moveable structure (e.g., six degrees of freedom). In some examples, first support structure 165 may include structure connector 170. Structure connector 170 may be similar to the connectors described above. In some implementations, structure connector 170 may include a tool connector of the robotic tool changer.

Second support structure 175 may be similar to first support structure 165. Second support structure 175 may be a support structure that is part of a second ride system that is different than the first ride system. In some implementations, first support structure 165 and second support structure 175 may be part of a same ride system.

Controller 185 may include one or more devices configured to control an operation of robot assembly 105 and/or passenger compartment 150. Controller 185 may control robot assembly 105 and/or passenger compartment 150 by providing one or more signals (e.g., control signals) to robot assembly 105 and/or passenger compartment 150. In some examples, controller 185 may control the operation of robot assembly 105 and/or passenger compartment 150 based on the sensor data from sensor device 145 and/or the secured connection data from one or more of the connectors described herein. The sensor data may include information identifying first compartment connector 155, information identifying second compartment connector 160, information identifying structure connector 170. The sensor data may be used by controller 185 to control robot assembly 105 to identify a location of first compartment connector 155, a location of second compartment connector 160, and a location of structure connector 170.

For example, assume that second compartment connector 160 is connected to structure connector 170 of first support structure 165 and that passenger compartment 150 is to be moved to second support structure 175. In this regard, controller 185 may control robot assembly 105 to identify a location of first compartment connector 155 and a location of structure connector 170 of second support structure 175. Based on identifying the location of first compartment connector 155, controller 185 may control robot assembly 105 to move robotic arm connector 140 toward first compartment connector 155 and establish a connection between robotic arm connector 140 and first compartment connector 155. Controller 185 may control robot assembly 105 to move robotic arm connector 140 by moving base 110, shoulder 115, elbow 120, and/or wrist 125, thereby causing a movement of robotic arm 130.

In some examples, controller 185 may receive secured connection data from robotic arm connector 140 and/or from first compartment connector 155. The secured connection data may indicate that robotic arm connector 140 has been securely connected to first compartment connector 155. Based on receiving the secured connection data, controller 185 detect a secured connection between robotic arm connector 140 and first compartment connector 155 and may cause second compartment connector 160 to be disconnected from structure connector 170 of first support structure 165.

For example, controller 185 may provide a signal to robot assembly 105 to cause robot assembly 105 to provide a signal to second compartment connector 160 to disconnect from structure connector 170 of first support structure 165 and/or provide a signal to structure connector 170 to disconnect from second compartment connector 160. Alternatively, controller 185 may provide a signal to second compartment connector 160 to disconnect from structure connector 170 of first support structure 165 and/or provide a signal to structure connector 170 to disconnect from second compartment connector 160.

Controller 185 may receive an indication that second compartment connector 160 has been disconnected from structure connector 170 of first support structure 165. The indication may be received from robotic arm connector 140, second compartment connector 160, and/or structure connector 170 of first support structure 165. Based on receiving the indication, controller 185 may cause robot assembly 105 to identify (e.g., based on the sensor data) the location of structure connector 170 of second support structure 175. Based on identifying the location of structure connector 170 of second support structure 175, controller 185 may control robot assembly 105 to move passenger compartment 150 (e.g., second compartment connector 160) toward structure connector 170 of second support structure 175 and establish a connection between second compartment connector 160 and structure connector 170 of second support structure 175.

In some examples, controller 185 may receive secured connection data from second compartment connector 160 and/or from structure connector 170 of second support structure 175. The secured connection data may indicate that second compartment connector 160 has been securely connected to structure connector 170 of second support structure 175. Based on receiving the secured connection data, controller 185 may cause robotic arm connector 140 to be disconnected from first compartment connector 155.

As indicated above, FIG. 1 is provided as an example. Other examples may differ from what is described with regard to FIG. 1. The number and arrangement of devices shown in FIG. 1 are merely provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
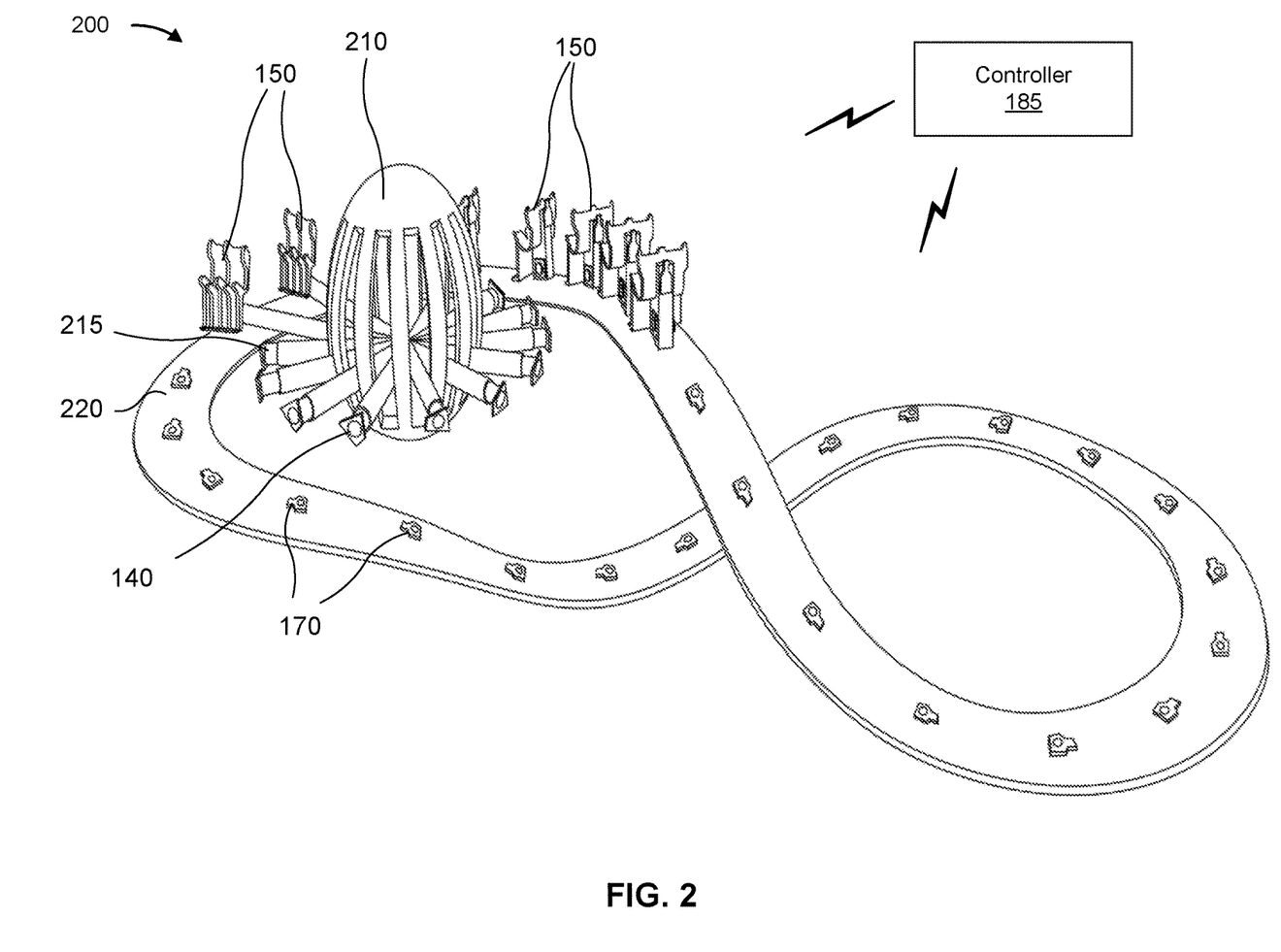
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include passenger compartments 150 (collectively referred to as "passenger compartments 150" and individually referred to as "passenger compartment 150"), controller 185, a hub structure 210, arm members 215 (collectively referred to as "arm members 215" and individually referred to as "arm member 215"), and a third support structure 220. Some elements of environment 200 have been described in connection with FIG. 1. As shown in FIG. 2, hub structure 210 may support arm members 215. Hub structure 210 may be configured to rotate, thereby causing arm members 215 to rotate.

In some examples, arm members 215 may be similar to robot assembly 105 described above in connection with FIG. 1. As shown in FIG. 2, arm member 215 may include robotic arm connector 140. Third support structure 220 may be configured to support passenger compartments 150 and structure connectors 170. As shown in FIG. 2, third support structure 220 may be configured to convey passenger compartments 150 toward members 215.

Controller 185 may be configured to control an operation of hub structure 210. For example, controller 185 may be configured to control a movement (e.g., a rotational speed) of hub structure 210 by providing one or more signals to a component of hub structure 210 (e.g., a component that causes hub structure 210 to rotate). Additionally, or alternatively, controller 185 may be configured to control an operation of third support structure 220. For example, controller 185 may be configured to control a movement of third support structure 220 to cause third support structure 220 to move one or more passenger compartment 150 toward arm members 215. Additionally, or alternatively, controller 185 may be configured to control an operation of arm members 215 and/or passenger compartment 150 in a manner similar to manner described above in connection with FIG. 1. For example, controller 185 may be configured to cause arm member 215 to be connected to a first passenger compartment 150, to be disconnected from the first passenger compartment 150, to be connected to a second passenger compartment 150, to be disconnected from the second passenger compartment 150, and so on.

As indicated above, FIG. 2 is provided as an example. Other examples may differ from what is described with regard to FIG. 2. The number and arrangement of devices shown in FIG. 2 are merely provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
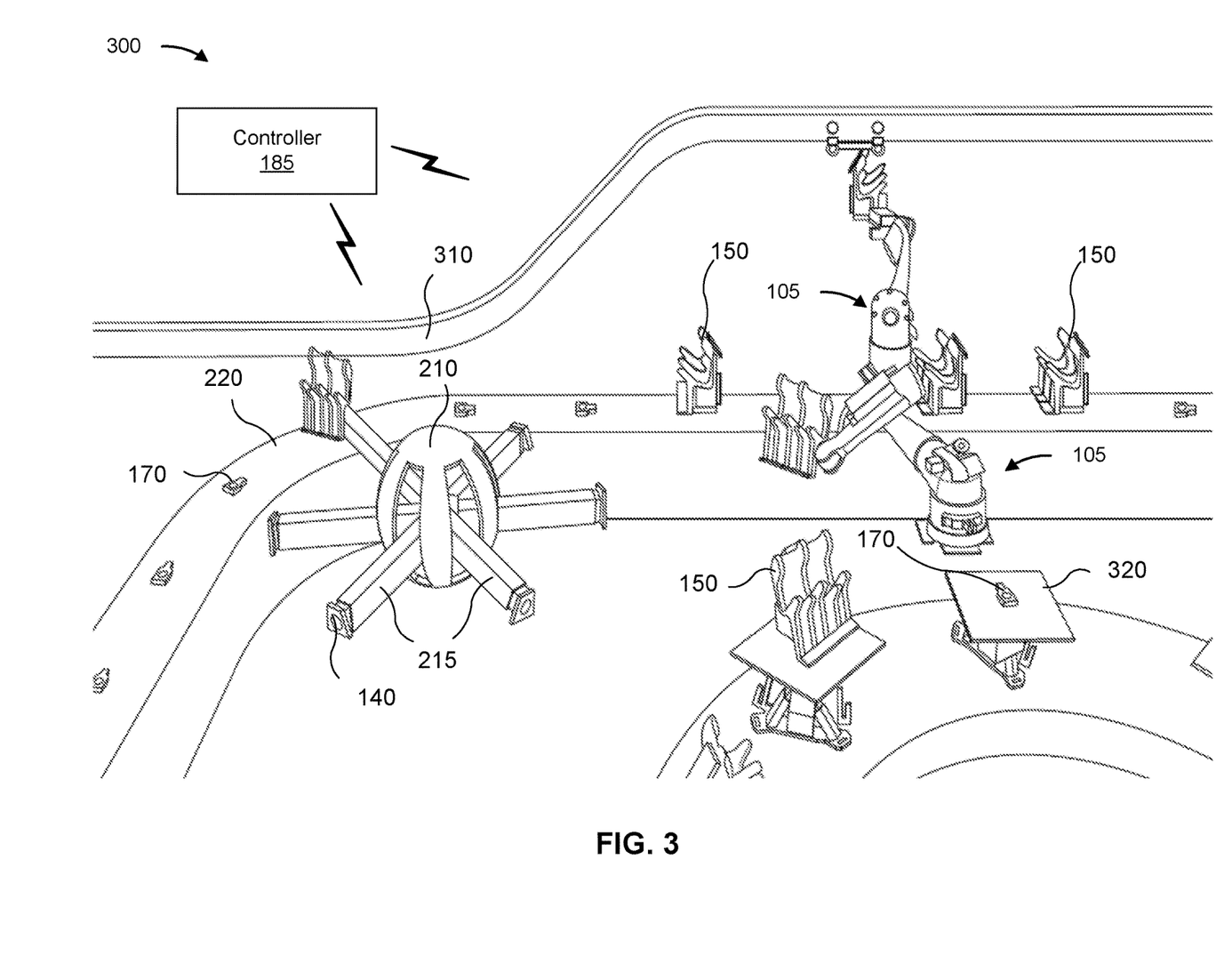
FIG. 3 is a diagram of an example environment in which systems and/or methods described herein may be implemented.

FIG. 3 is a diagram of an example environment 300 in which systems and/or methods described herein may be implemented. Some elements of environment 300 have been described in connection with FIG. 1 and FIG. 2. As shown in FIG. 3, environment 300 may include robotic assemblies 105 (collectively referred to as "robotic assemblies 105" and individually referred to as "robotic assembly 105"), passenger compartments 150 (collectively referred to as "passenger compartments 150" and individually referred to as "passenger compartment 150"), controller 185, hub structure 210, arm members 215 (collectively referred to as "arm members 215" and individually referred to as "arm member 215"), and third support structure 220.

As shown in FIG. 3, environment 300 may further include a fourth support structure 310 and a fifth support structure 320. In some implementations, fourth support structure 310 may include a track. Fourth support structure 310 may be configured to support one or more passenger compartments 150 and move the one or more passenger compartments 150 along the track. In some implementations, fifth support structure 320 may include a platform. In some examples, fifth support structure 320 may be stationary. Alternatively, fifth support structure 320 may be moveable (e.g., six degrees of freedom).

Third support structure 220 may be part of a first ride system, fourth support structure 310 may be part of a second ride system, and fifth support structure 320 may be part of a third ride system different than the first ride system and the second ride system. The second ride system may be different than the first ride system. The third ride system may be different than the first ride system and the second ride system.

Controller 185 may be configured to control an operation of robotic assemblies 105, passenger compartment 150, hub structure 210, third support structure 220, fourth support structure 310, and fifth support structure 320 in a manner similar to manner described above in connection with FIG. 1 and FIG. 2. For example, controller 185 may be configured to cause robotic assemblies 105 transport one or more passenger compartments 150 between different ride systems. For instance, controller 185 may be configured to cause a first robot assembly 105 to move a first passenger compartment 150 between the first ride system to the second ride system. Additionally, or alternatively, controller 185 may be configured to cause a second robot assembly 105 to move a second passenger compartment 150 between the second ride system to the third ride system.

As indicated above, FIG. 3 is provided as yet another example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
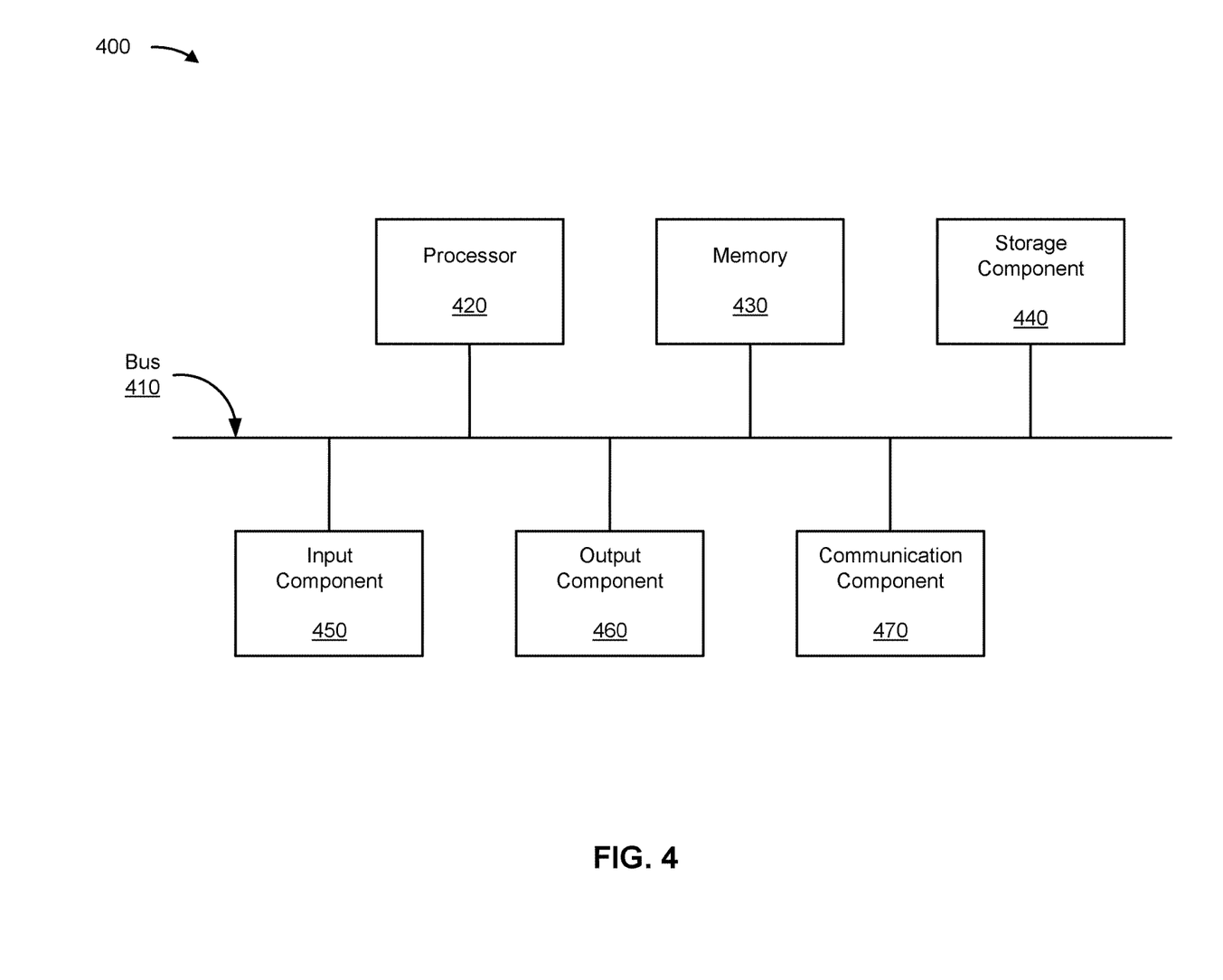
FIG. 4 is a diagram of example components of one or more devices of FIG. 1.

FIG. 4 is a diagram of example components of a device 400, which may correspond to robot assembly 105, robotic arm connector 140, controller 185, sensor device 145, first compartment connector 155, second compartment connector 160, and/or structure connector 170. In some implementations, robot assembly 105, robotic arm connector 140, controller 185, sensor device 145, first compartment connector 155, second compartment connector 160, and/or structure connector 170 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440)

may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
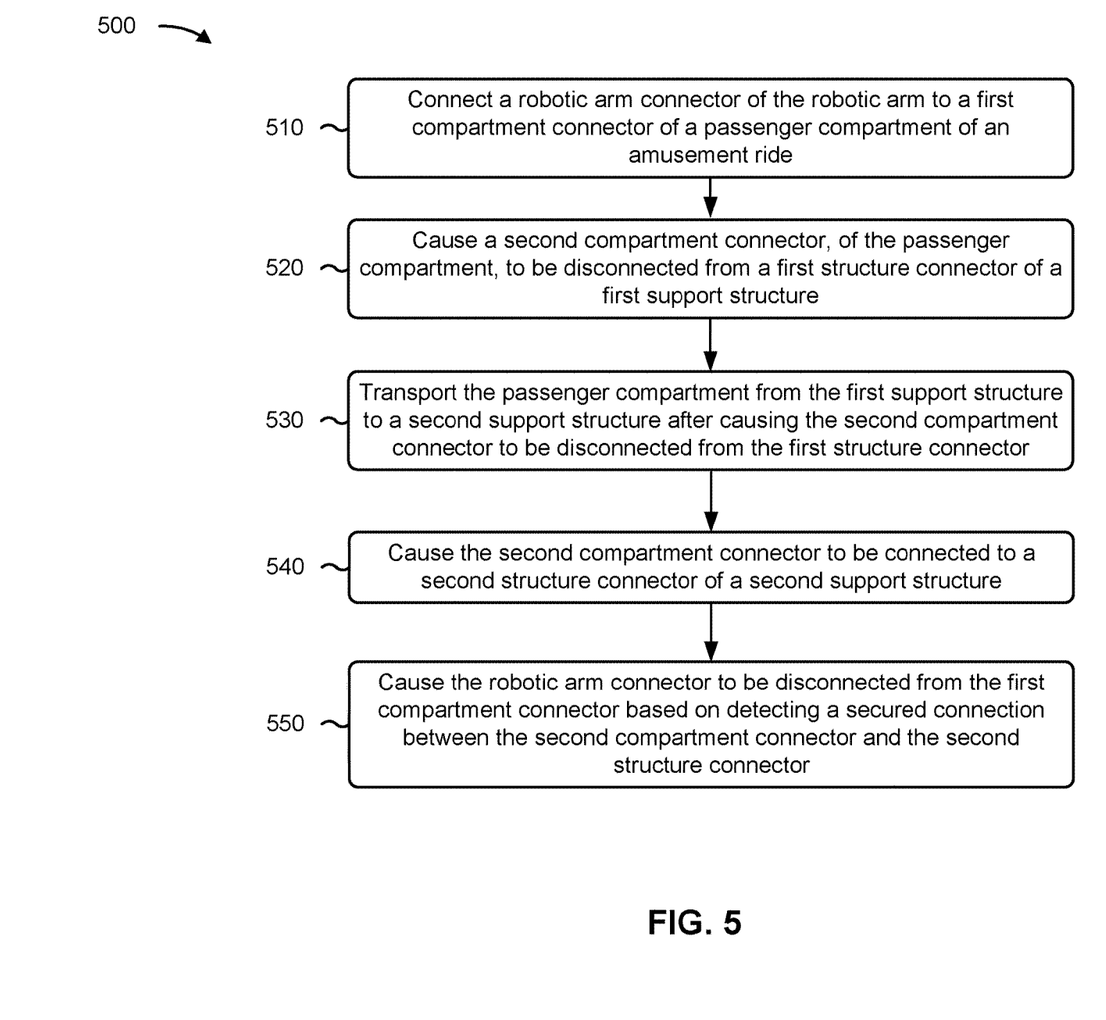
FIG. 5 is a flowchart of an example process relating to transferring a passenger compartment between ride systems using a robotic arm.

FIG. 5 is a flowchart of an example process 500 relating to transferring a passenger compartment between ride systems using a robotic arm. In some implementations, one or more process blocks of FIG. 5 may be performed by a controller (e.g., controller 185). In some implementations, one or more process blocks of FIG. 5 may be performed by another device or a group of devices separate from or including the controller, such as a robot assembly (e.g., robot assembly 105), a robotic arm connector (e.g., robotic arm connector 140), a sensor device (e.g., sensor device 145), a first compartment connector (e.g., first compartment connector 155), a second compartment connector (e.g., second compartment connector 160), and/or a structure connector (e.g., structure connector 170). Additionally, or alternatively, one or more process blocks of FIG. 5 may be performed by one or more components of device 400, such as processor 420, memory 430, storage component 440, input component 450, output component 460, and/or communication interface 470.

As shown in FIG. 5, process 500 may include causing a robotic arm connector, of the robotic arm, to be connected to a first compartment connector of a passenger compartment of an amusement ride (block 510). For example, the controller may cause a robotic arm connector, of the robotic arm, to be connected to a first compartment connector of a passenger compartment of an amusement ride, as described above.

As further shown in FIG. 5, process 500 may include causing a second compartment connector, of the passenger compartment, to be disconnected from a first structure connector of a first support structure (block 520). For example, the controller may cause a second compartment connector, of the passenger compartment, to be disconnected from a first structure connector of a first support structure, as described above.

As further shown in FIG. 5, process 500 may include transporting the passenger compartment from the first support structure to a second support structure after causing the second compartment connector to be disconnected from the first structure connector (block 530). For example, the controller may transport the passenger compartment from the first support structure to a second support structure after causing the second compartment connector to be disconnected from the first structure connector, as described above.

As further shown in FIG. 5, process 500 may include causing the second compartment connector to be connected to a second structure connector of a second support structure (block 540). For example, the controller may cause the second compartment connector to be connected to a second structure connector of a second support structure, as described above.

As further shown in FIG. 5, process 500 may include causing the robotic arm connector to be disconnected from the first compartment connector based on detecting a secured connection between the second compartment connector and the second structure connector (block 550). For example, the controller may cause the robotic arm connector to be disconnected from the first compartment connector based on detecting a secured connection between the second compartment connector and the second structure connector, as described above.

In some implementations, causing the second compartment connector to be disconnected from the first structure connector comprises detecting a secured connection between the robotic arm connector and the first compartment connector, and causing the second compartment connector to be disconnected from the first structure connector, based on detecting the secured connection. For instance, the controller may cause the robotic arm connector to be disconnected from the first compartment connector based on the controller verifying that the second compartment connector is securely connected to the second structure connector.

In some implementations, process 500 includes causing the second compartment connector to be connected to a second structure connector of the second support structure after transporting the passenger compartment from the first support structure to the second support structure, and disconnecting the robotic arm connector from the first compartment connector.

In some implementations, disconnecting the robotic arm connector from the first compartment connector comprises detecting a secured connection between the second compartment connector and the second structure connector, and disconnecting the robotic arm connector from the first compartment connector, based on detecting the secured connection.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single arm members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system, comprising:
    a first support structure comprising a first structure connector;
    a second support structure comprising a second structure connector;
    a robotic arm, of a robot assembly, comprising a robotic arm connector at a distal end of the robotic arm;
    a passenger compartment of an amusement ride,
        wherein the passenger compartment comprises a first compartment connector and a second compartment connector, and
        wherein the first compartment connector is configured to be connected to one of the first structure connector or the second structure connector; and
    a controller configured to cause the robotic arm to:
        connect the robotic arm connector to the second compartment connector,
        cause the first compartment connector to be disconnected from the one of the first structure connector or the second structure connector, after connecting the robotic arm connector to the second compartment connector; and
        transport the passenger compartment between the first support structure and the second support structure after causing the first compartment connector to be disconnected.

2. The system of claim 1, wherein the first support structure is a support structure of a first ride system, and
    wherein the second support structure is a support structure of a second ride system different than the first ride system.

3. The system of claim 1, wherein the controller is further configured to cause the robotic arm to:
    connect the first compartment connector to another one of the first structure connector or the second structure connector; and
    disconnect the second compartment connector from the robotic arm connector after connecting the first compartment connector to the another one of the first structure connector or the second structure connector.

4. The system of claim 1, wherein the controller, to cause the first compartment connector to be disconnected, is configured to cause the robotic arm to:
    detect a secured connection between the robotic arm connector and the second compartment connector; and
    cause the first compartment connector to be disconnected from the one of the first structure connector or the second structure connector, based on detecting the secured connection.

5. The system of claim 1, wherein the robotic arm connector is a master connector of a robotic tool changer, and
    wherein the second compartment connector is a tool connector of the robotic tool changer.

6. The system of claim 1, wherein one of the first support structure or the second support structure includes a platform, and
    wherein the platform is a moveable platform.

7. The system of claim 1, wherein one of the first support structure or the second support structure includes a platform, and
    wherein the platform is a stationary platform.

8. A ride, comprising:
    a first support structure of a first ride system;
    a second support structure of a second ride system,
        wherein the second ride system is different than the first ride system;
    a passenger compartment comprising a first compartment connector; and
    a robot assembly comprising a robotic arm, the robotic arm comprising a robotic arm connector,
        wherein the robotic arm is configured to transport the passenger compartment between the first support structure and the second support structure,
        wherein the robotic arm connector is a master connector of a robotic tool changer, and
        wherein the first compartment connector is a tool connector of the robotic tool changer.

9. The ride of claim 8, wherein the passenger compartment is connected to the first support structure, and
wherein the robotic arm is configured to:
disconnect the passenger compartment from the first support structure,
transport the passenger compartment to the second support structure, and
connect the passenger compartment to the second support structure.

10. The ride of claim 8, wherein at least one of the first support structure or the second support structure is a movable support structure.

11. The ride of claim 10, wherein at least one of the first support structure or the second support structure is a stationary support structure.

12. The ride of claim 8, wherein the first compartment connector is configured to be connected to the robotic arm connector.

13. The ride of claim 12, wherein the first support structure comprises a first structure connector,
wherein the second support structure comprises a second structure connector, and
wherein the passenger compartment further comprises a second compartment connector configured to be connected to one of the first structure connector or the second structure connector.

14. The ride of claim 13,
wherein the first structure connector and the second structure connector are tool connectors of the robotic tool changer.

15. The ride of claim 8, further comprising a controller configured to control an operation of the robotic arm.

16. A method performed by a controller associated with a robotic arm, the method comprising:
causing a robotic arm connector, of the robotic arm, to be connected to a first compartment connector of a passenger compartment of a ride;
causing a second compartment connector, of the passenger compartment, to be disconnected from a first structure connector of a first support structure; and
transporting the passenger compartment from the first support structure to a second support structure after causing the second compartment connector to be disconnected from the first structure connector.

17. The method of claim 16, wherein causing the second compartment connector to be disconnected from the first structure connector comprises:
detecting a secured connection between the robotic arm connector and the first compartment connector; and
causing the second compartment connector to be disconnected from the first structure connector, based on detecting the secured connection.

18. The method of claim 16, further comprising:
causing the second compartment connector to be connected to a second structure connector of the second support structure after transporting the passenger compartment from the first support structure to the second support structure; and
disconnecting the robotic arm connector from the first compartment connector.

19. The method of claim 18, wherein disconnecting the robotic arm connector from the first compartment connector comprises:
detecting a secured connection between the second compartment connector and the second structure connector; and
disconnecting the robotic arm connector from the first compartment connector, based on detecting the secured connection.

20. The method of claim 16, wherein the robotic arm connector is a master connector of a robotic tool changer, and
wherein the second compartment connector is a tool connector of the robotic tool changer.

* * * * *